US008412551B2

(12) United States Patent
Feng et al.

(10) Patent No.: US 8,412,551 B2
(45) Date of Patent: Apr. 2, 2013

(54) FORMAL STRUCTURE-BASED ALGORITHMS FOR LARGE SCALE RESOURCE SCHEDULING OPTIMIZATION

(75) Inventors: Xiaoming Feng, Cary, NC (US); Yuan Liao, Cary, NC (US); John Dennis Finney, Raleigh, NC (US); Adolfo Fonseca, Raleigh, NC (US)

(73) Assignee: ABB Research Ltd., Zurich (CH)

( * ) Notice: Subject to any disclaimer, the term of this patent is extended or adjusted under 35 U.S.C. 154(b) by 1757 days.

(21) Appl. No.: 10/970,201

(22) Filed: Oct. 21, 2004

(65) Prior Publication Data
US 2006/0089864 A1 Apr. 27, 2006

(51) Int. Cl.
*G06Q 10/00* (2006.01)
(52) U.S. Cl. ......................................... 705/7.12; 706/12
(58) Field of Classification Search .................. 705/7.12
See application file for complete search history.

(56) References Cited

U.S. PATENT DOCUMENTS

| | | | | |
|---|---|---|---|---|
| 5,343,388 A | * | 8/1994 | Wedelin | 705/8 |
| 5,715,165 A | * | 2/1998 | Luh et al. | 700/173 |
| 5,826,252 A | * | 10/1998 | Wolters et al. | 717/101 |
| 6,208,982 B1 | | 3/2001 | Allen, Jr. et al. | |
| 6,701,201 B2 | | 3/2004 | Hegde et al. | |
| 6,865,562 B2 | * | 3/2005 | Fromherz et al. | 706/14 |
| 7,062,448 B2 | * | 6/2006 | Trautmann et al. | 705/8 |
| 2003/0036937 A1 | * | 2/2003 | Shahidehpour | 705/8 |

OTHER PUBLICATIONS

Granelli et al. "Security-constrained economic dispatch using dual quadratic programming", Elsevier, Electric Power Systems Research 56 (2000) pp. 71-80.*
Redondo, et al. "short-term hydro-thermal coordination by Langrangian Relaxation: solution of the dual problem", IEEE transactions on power system, vol. 14, No. 1 Feb. 1999.*
Zhai et al. "Unit commitment with identical units: successive sub-problem solving method based on Langrangian Relaxation," IEEE transactions on power system, vol. 17, No. 4, Nov. 2002.*

(Continued)

*Primary Examiner* — Jonathan G Sterrett
*Assistant Examiner* — Tzu-Hsiang Lan
(74) *Attorney, Agent, or Firm* — Steven W. Hudnut; Womble Carlyle Sandridge & Rice

(57) ABSTRACT

A method and computer program product for optimization of large scale resource scheduling problems. Large scale resource scheduling problems are computationally very hard and extremely time consuming to solve. This invention provides a Lagrangian relaxation based solution method. The method has two distinct characteristics. First, the method is formal. It is completely structure-based and does not use any problem domain specific knowledge in the solution process, either in the dual optimization or the primal feasibility enforcement process. Second, updating the Lagrangian multipliers after solution of every sub-problem without using penalty factors results in fast and smooth convergence in the dual optimization. The combination of high quality dual solution and the structure-based primal feasibility enforcement produces a high quality primal solution with very small solution gap. An optimal solution is first found to the dual of the resource scheduling problem by sequentially finding a solution to a plurality of sub-problems and updating a set of values used in the dual problem formulation after each sub-problem solution is obtained. Coupling constraint violations are systematically reduced and the set of values are updated until a feasible solution to the primal resource scheduling problem is obtained. An initial set of multiplier values is further determined by solving a relaxed version of the primal problem where most of the local constraints except the variable bounds are relaxed.

31 Claims, 6 Drawing Sheets

OTHER PUBLICATIONS

Fisher, Marshall L, "The Lagrangian relaxation method for solving integer programming problems", Management science, vol. 50, No. 12, Dec. 2004 pp. 1861-1871.*

Sweeney, Dennis J et al., "a method of decomposition for integer programs," operations research, vol. 27, No. 6, Nov.-Dec. 1919 pp. 1128-1141.*

R. Kipp Martin " Generating alternative MIP programming modesl using variable redefinition", Operations Research, vol. 35 No. 6 (Nov.-Dec. 1987), pp. 820-831.*

V.S. Ramakrishnan et al., "Analyzing Multi-objective linear and mix integer programs by Lagrange Multipliers" Operations Research, 258-91, Jul. 1991.*

Gorry et al., "relaxation methods for pure and mix integer programming problems", Management Science, vol. 18, No. 5, Jan. 1972 pp. 229-239.*

Adino, et al., "Parallel Evolutionary Optimisation with Constraint Propagation", Department of Computer Science, Department of Computer Architecture, Universidad Complutense de Madrid.

Holmberg, et al. "A Lagrangian Heuristic Based Branch-and-Bound Approach for the Capacitated Network Design Problem", Department of Mathematics, Linkoping Institute of Technology, Feb. 1997.

Ruiz-Andino, et al., "A Hybrid Evolutionary Approach for Solving Constraint Optimization Problems over Finite Domains", IEEE Transactions on Evolutionary Computation, vol. 4, No. 4, Nov. 2000.

Redondo, et al., "Short-Term Hydro-Thermal Coordination by Langrangian Relaxation: Solution of the Dual Problem", IEEE Transactions on Power Systems, vol. 14, No. 1 Feb. 1999.

Zhai, et al., "Unit Commitment with Identical Units: Successive Subproblem Solving Method Based on Langrangian Relaxation," IEEE Transactions on Power Systems, vol. 17, No. 4, Nov. 2002.

Rattanakul, "A New Efficient Algorithm for Unit Commitment and Economic Dispatch Planning", Electrical Engineering and Computer Science, Case Western Reserve University, Jan. 2001.

D. Streiffert, R. Philbrick, and A. Ott, "A Mixed Integer Programming Solution for Market Clearing and Reliability Analysis," IEEE Power Engineering Society 2005 General Meeting, 2005, pp. 2724-2731, vol. 3.

"General Algebraic Modeling System," http://en.wikipedia.org/wiki/General_Algebraic_Modeling_System, printed Aug. 21, 2012.

"AMPL" http://en.wikipedia.org/wiki/AMPL, printed Aug. 21, 2012.

"Linear programming," http://en.wikipedia.org/wiki/Linear_programming, printed Aug. 21, 2012.

Robert E. Bixby, "Solving Real-World Linear Programs: A Decade and More of Progress," Operations Research, vol. 50, No. 1, pp. 3-15, Jan.-Feb. 2002.

* cited by examiner

FORMAL STRUCTURE-BASED ALGORITHMS FOR LARGE SCALE RESOURCE SCHEDULING OPTIMIZATION

FIELD OF THE INVENTION

The present invention relates generally to large scale resource scheduling optimization, and more particularly, to general structure-based methods that are applicable to large scale resource scheduling optimization.

BACKGROUND OF THE INVENTION

Resource scheduling is a special class of optimization problem, in which a mix of available resources are utilized to satisfy demand side requirements over a given time horizon at prescribed temporal or spatial resolutions. The decisions to be made involve the determination of optimal operation schedules for all resources involved. The operation schedule for a resource can be described by the startup and shutdown, and utilization at each time step over the scheduling horizon. The operation schedules for all the resources are determined such that various local and global constraints are satisfied and some generalized cost function is minimized. A well-known classic example of resource scheduling problem is the so called unit commitment problem in the electric power industry, where the resources are the thermal, hydro power plants in the system; the demand side requirements are the total customer hourly load over 24 or 168 hours. The startup, shutdown, and utilization of each plant is referred to as commitment, de-commitment. and dispatch. The operation schedule for each plant must satisfy the local constraints such as minimum up time, minimum down time, ramping constraint, and available capacity limitations. Collectively, all the plants committed must also satisfy global constraints such as various reserve requirements and energy balance constraints.

The resource scheduling problem, by its combinatorial nature, is very hard. The computational burden increases exponentially with the number of resources and the time steps in the scheduling horizon. To overcome the "curse of dimensionality", decomposition techniques based on Lagrangian relaxation theory are generally used. In these decomposition methods, the original optimization problem is relaxed by removing the so called "complicating constraints", also known as "coupling constraints", to obtain a separable optimization problem, which can be divided into many smaller independent optimization problems, usually referred to as sub-problems. All the sub-problems are solved, e.g., one sub-problem for each unit in the unit commitment problem, and the Lagrangian multipliers are updated at a high level. The solutions of the sub-problems are coordinated by a set of price signals for the complicating constraints.

The performance of a resource scheduling method is measured by the following criteria: (1) optimality, (2) feasibility and (3) speed. Optimality measures how close the solution is to the theoretical best. A feasibility check ensures that all constraints have been satisfied. Speed is how fast the method is at finding the solution. The optimality of the solution is usually measured by the solution gap. The solution gap is a conservative estimate of the closeness of a solution to a theoretical optimum solution in terms of an objective value. Solution gap is defined by (OBJ−LB)/OBJ expressed as a percent, where OBJ is the best integer solution found and LB is the tightest lower bound known for the problem.

An optimization method based on Lagrangian relaxation typically includes two main steps: (1) Lagrangian dual optimization to get an optimal dual solution; and (2) construction of a primal feasible solution. The problem encountered in the first step is an optimization of the non-differentiable dual function, which is commonly solved by variations of subgradient (SG) and cutting plane (CP) methods. This is an iterative process plagued by slow convergence, requiring hundreds, sometimes thousands of iterations. Quickly getting to the optimal dual solution is an attractive and challenging objective in the design of Lagrangian relaxation-based algorithms.

The primal solution corresponding to the optimal dual solution in general is not ensured to be feasible for all the coupling constraints. The second step attempts to make the primal solution feasible by applying various problem dependent heuristics to adjust the primal solution until it becomes feasible. The heuristics rules are generally constructed from experience and insight into the specific problems at hand and lack generality. The method disclosed herein offers a huge performance advantage over the traditional Lagrangian relaxation-based methods by providing fast dual optimization and a problem independent process for feasibility enforcement.

SUMMARY OF THE INVENTION

The present invention provides a complete solution process for large-scale resource scheduling optimization and has the following unique advantages:
1. the solution process is completely structure-based—being a formal method, the inventive solution is independent of problem domain knowledge and thus could be applicable to a wide class of problems;
2. the solution provides very fast dual optimization—obtaining a high quality dual solution in just a few iterations, the invention results in drastic execution speed improvement over other methods;
3. the solution uses structure-based heuristics to search for primal feasibility—no problem formulation specific heuristics are required, thus increasing reusability for other resource scheduling problems; and
4. the solution is a completely automated process.

In an exemplary embodiment, the invention is directed to a method for optimization of large scale resource scheduling. An optimal solution is first found to the dual of the resource scheduling problem by sequentially finding a solution to a plurality of sub-problems and updating a set of multiplier values used in the dual problem formulation after each sub-problem solution is obtained. Lagrangian relaxation techniques can be used to obtain the dual solution and the set of values updated after each sub-problem is solved are Lagrangian multipliers. The solution to the dual optimization disclosed herein does not use any penalty factors. Coupling constraint violations are systematically reduced and the set of multiplier values are updated until a feasible solution to the primal resource scheduling problem is obtained. The method optionally includes estimating the lower bound to the primal resource scheduling problem which, in turn, is used as an estimate for the upper bound of the dual resource scheduling problem. An initial set of multiplier values is further determined by solving a relaxed version of the primal problem where most of the local constraints except the variable bounds are relaxed.

The structure-based algorithm of the invention is particularly well-suited for large scale resource scheduling such as the unit commitment problem in the electric power industry wherein hydro and thermal generating units are scheduled for operation to meet demand over a period of time while minimizing total operating costs. In the simplest case, the scheduling problem is decomposed into a single sub-problem for each thermal plant and for each hydroelectric plant.

BRIEF DESCRIPTION OF THE DRAWINGS

The invention is better understood by reading the following detailed description of the invention in conjunction with the accompanying drawings.

DETAILED DESCRIPTION OF THE INVENTION

The following description of the invention is provided as an enabling teaching of the invention in its best, currently known embodiment. Those skilled in the relevant art will recognize that many changes can be made to the embodiments described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and may even be desirable in certain circumstances and are a part of the present invention. Thus, the following description is provided as illustrative of the principles of the present invention and not in limitation thereof, since the scope of the present invention is defined by the claims.

Figure 1:
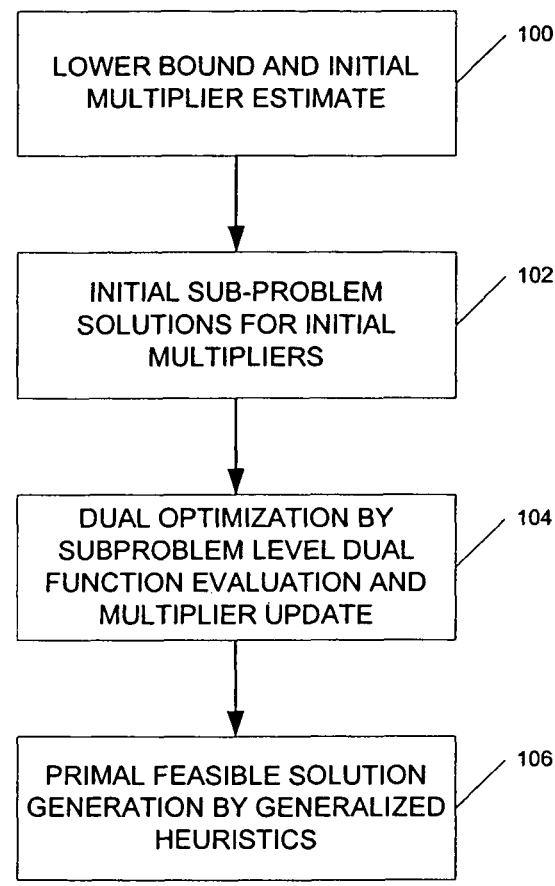
FIG. 1 illustrates the processing logic for the structure-based algorithm for large scale resource scheduling optimization in accordance with an exemplary embodiment of the invention.

FIG. 1 depicts the major steps in the inventive process in an exemplary embodiment. For convenience of description, and without any loss of generality, the resource scheduling problem is described herein as a minimization problem. It needs to be pointed out that the disclosed process is a meta-algorithm in the sense that it does not care how the specific sub-problems are formulated or solved, as long as the sub-problems can be solved by a suitable formulation and means. For example, the sub-problems could be expressed as linear programming problems or as non-linear programming problems. In the particular implementation realized to test the solution process, the sub-problems were formulated as mixed integer programming (MIP) and solved by a commercially available MIP solver.

The first step (block 100) is the estimation of the lower bound of the problem to be solved. If the estimation is available from other sources, this step is optional. When the resource scheduling is formulated as a MIP problem, the lower bound can be quickly obtained by removal of sub-problem level constraints and integer relaxation. The resulting lower bound will be used as an estimate of the upper bound of the dual problem. If this step is executed, the multipliers for the complicating constraints can be estimated from the resulting linear programming (LP) problem.

In the second step (block 102), all sub-problems are solved once for the initial set of multipliers to get the initial primal solution. If the first step is skipped, an initial multiplier set of zero can be used with very little effect on the convergence of the solution process.

In the third step (block 104), the dual problem is optimized by sequentially solving sub-problems and updating the multipliers after each sub-problem solution. The Lagrangian dual function is evaluated after each sub-problem solution, and an update for the multipliers is calculated. This differs from the traditional approach where multipliers are updated after all sub-problems are solved for a given set of multipliers. This design also differs in fundamental ways from a prior art method that uses a set of penalty factors to reduce violation of the coupling constraints and requires some follow up process that uses problem dependent heuristics to make the primal solution feasible. The presence of penalty factors causes significant bias in the multiplier update process and reduces the optimality of the dual solution. The solution disclosed herein does not use any penalty factors in the dual optimization phase and does not concern itself with primal feasibility until the next step.

The fourth step (block 106) searches for primal feasibility by systematically reducing violations of coupling constraints. It updates the multipliers based on the modified subgradients and solve the corresponding sub-problems until feasibility is achieved.

The method successively solves resource scheduling problems with hundreds of thousands of variables and several hundred thousand constraints, producing solutions that are 100% feasible with very good solution gap, thereby reducing solution time by orders of magnitude as compared with optimization by a standard solver directly.

For simplicity of notation, the inventive algorithm is described with respect to a reference model for resource scheduling optimization. The reference model is expressed as a mixed integer programming (MIP) problem, which is done solely to describe the principles of the invention.

The Reference Model and Notations

Minimize $c^T x$ $Ax=b$ $A_c x >= b_c$

Subject to $B_l <= x <= B_u$ $x >= 0$

The above problem will be referred to as problem P. $A_c$ is the constraint matrix for the coupling rows. A is the constraint matrix for the non-coupling rows. The inclusion of only greater than constraints for the coupling rows will not affect the generality of the method. By adding slack variables to the coupling rows, we get the following problem PS:

Minimize $c^T x + c_s^T S_c$ $Ax=b$ $A_c x + S_c >= b_c$

Subject to $B_l <= x <= B_u$ $x >= 0$

The Lagrangian is defined as:

$$L(\lambda, x) = c^T x + \lambda^T (b_c - A_c x)$$

where $\lambda$ is Lagrangian multiplier vector for the coupling rows.

The Lagrangian dual function is defined as:

$$L(\lambda) = \underset{x}{\text{Min}}\, c^T x + \lambda^T (b_c - A_c x)$$

$$Ax = b$$

Subject to $$B_l <= x <= B_u$$

$$x >= 0$$

The Lagrangian dual function is separable into sub-problems. The k-th sub-problem, referred to as P(k), is defined by the following:

$$L_k(\lambda) = \underset{x_k}{\text{Min}}\, c_k^T x_k + \lambda^T (b_c - [A_c]_k x_k)$$

$$[A]_k x_k = b_k$$

Subject to $$B_l <= x_k <= B_u$$

$$x_k >= 0$$

Where
$x_k$ is the variable set for sub-problem k;
$c_k$ is the coefficient set for sub-problem k;
$[A_c]_k$ is the sub matrix of $A_c$, made up of columns corresponding to sub-problem k;
$[A]_k$ is the sub matrix of A, made up of columns corresponding to sub-problem k.

The processing logic for the structure-based algorithm for optimization of large scale separable resource scheduling illustrated in FIG. 1 does not show the initial step of problem setup. This initial step carries out the necessary preparation tasks for the succeeding steps. Several key problems and dual sub-problems are set up. Step 1 as indicated in logic block 100 obtains the estimation of the lower bound of the problem to be solved and the initial multipliers. All sub-problems are solved once for the initial set of multipliers to get the initial dual solution in the second step as indicated in logic block 102. In step 3, as indicated in logic block 104, the dual problem is optimized by sequentially solving sub-problems and updating the multiplier after each sub-problem solution. In step 4, as indicated in logic block 106, primal feasibility is achieved by systematically reducing coupling constraints violations.

Figure 2:
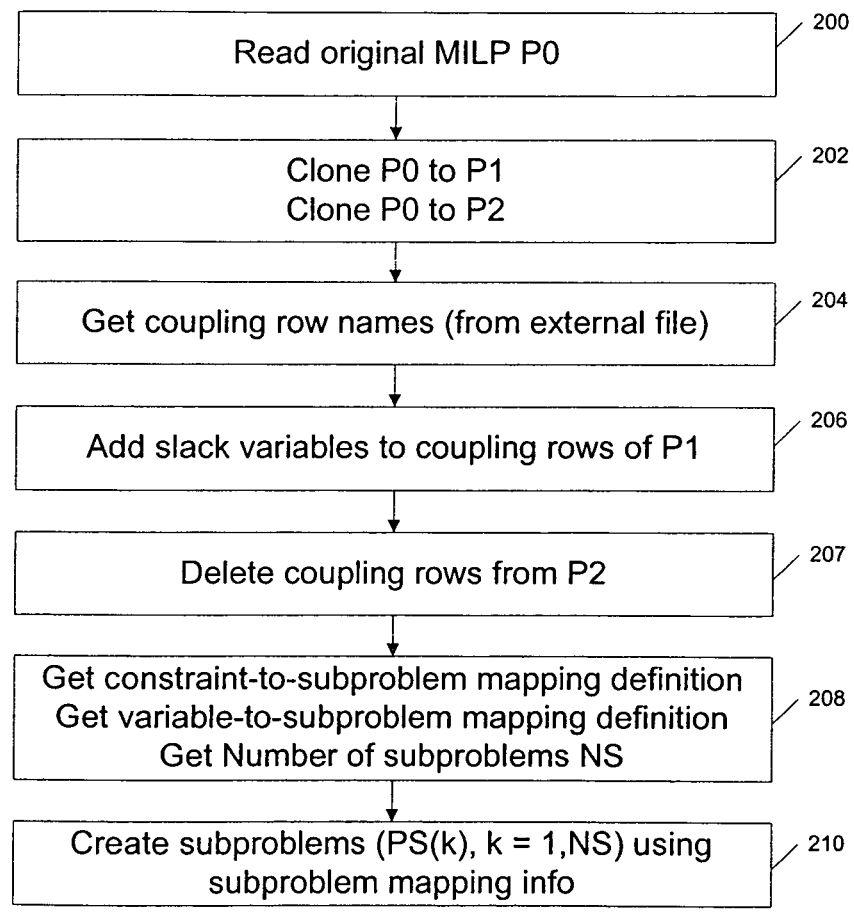
FIG. 2 illustrates the processing logic for the problem setup step of the algorithm in an exemplary embodiment.

FIG. 2 shows the detailed processing logic for the initial step of "problem setup". In logic blocks 200 and 202, the following key problems are set up: the original primal problem (P0), the problem (P1) obtained by cloning P0 and adding slack variables, the relaxed problem (P2) obtained by cloning P0 and removing coupling constraints, and all the sub-problems of P2 obtained by using given decomposition data. In logic block 204, coupling row names can be directly obtained from other programs or read from external disk files. In logic block 206, slack variables are added to the coupling rows of P1 and appropriate objective coefficients are set for the slack variables. As illustrated later, P1 will be used in the primal feasible solution generation step and the slack variables are used to calculate the infeasibility index. By deleting the coupling rows from P2 (logic block 207), the relaxed problem is obtained, which can be decomposed into smaller and independent easier-to-solve sub-problems as indicated in logic block 208. Decomposition is based on the constraint-to-sub-problem and variable-to-sub-problem mapping definitions, which specify the sub-problem to which each constraint and variable is partitioned. Accordingly, each of the sub-problems of P2 is created and set up as indicated in logic block 210.

Figure 3:
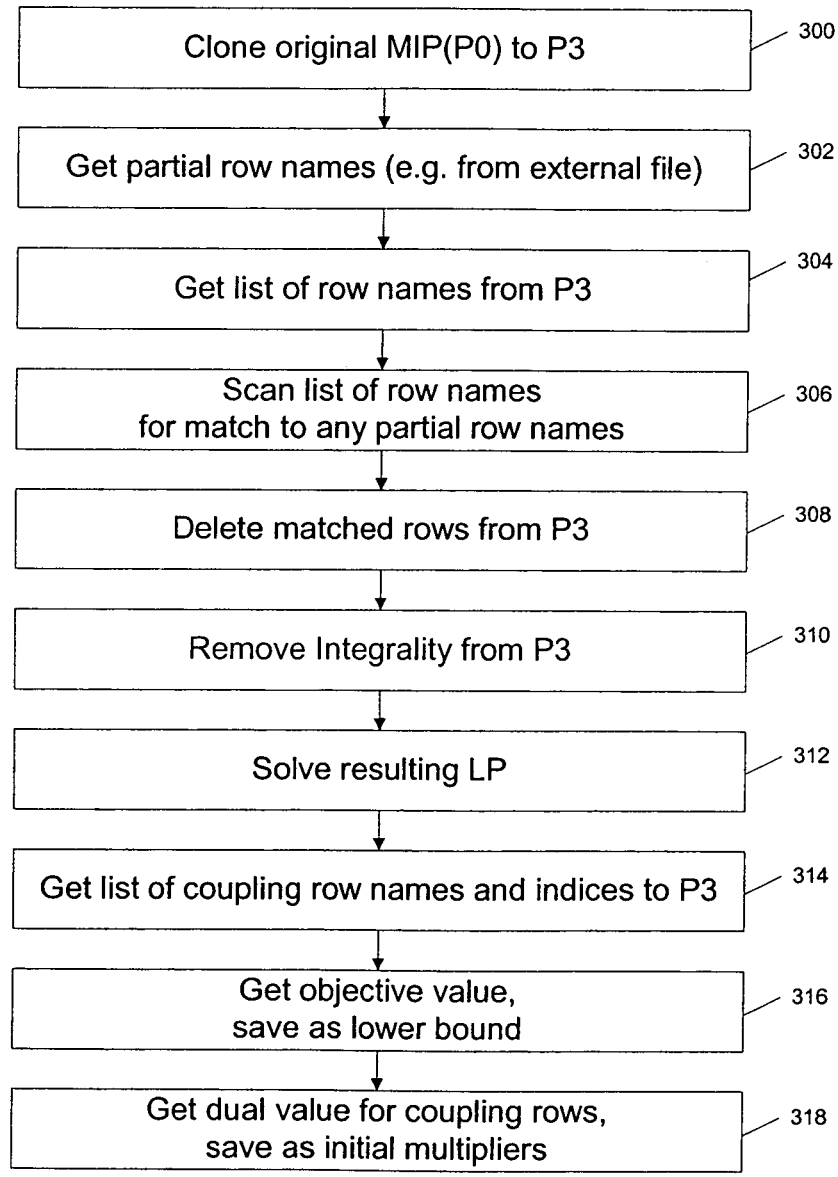
FIG. 3 illustrates the processing logic for the lower bound and initial multiplier estimate step of the algorithm in an exemplary embodiment.

FIG. 3 illustrates the processing logic for the "lower bound and initial multiplier estimate" step of the algorithm. This step of the algorithm obtains the estimation of the lower bound of the problem to be solved. If the estimation is available from other sources, this step is optional. In an exemplary embodiment, the resource scheduling is formulated as a MILP problem, and the lower bound is obtained by removal of sub-problem level constraints and integer relaxation. Sub-problem level constraints may include unit minimum up and down time, and unit ramping up and down constraints when applied to a unit commitment problem in the electric power industry. Integer relaxation removes the integrality constraints on the problem (logic block 310), and makes the problem a Linear Programming problem (logic block 312). The resulting lower bound (logic block 316) will be used as an estimate of the upper bound of the dual problem. If this step of the algorithm is executed, the multipliers, i.e., the dual of the complicating constraints, can be readily obtained from the solution of the resulting linear programming problem (logic block 318). In logic block 302, "get partial row names" obtains a list of string identifiers identifying the sub-problem level constraints to be deleted from the problem. The constraints with names that can match the string identifiers (logic block 306) will be removed from the problem (logic block 308).

Pseudocode for the lower bound and initial multiplier estimate step of the algorithm is as follows:
Lower Bound and Initial Multiplier Estimate Step (block 100)
Get problem P;
Remove local constraints;
Relax Integer variables;
Solve problem P;
Get objective value;
Get multipliers for coupling constraints.

Figure 4:
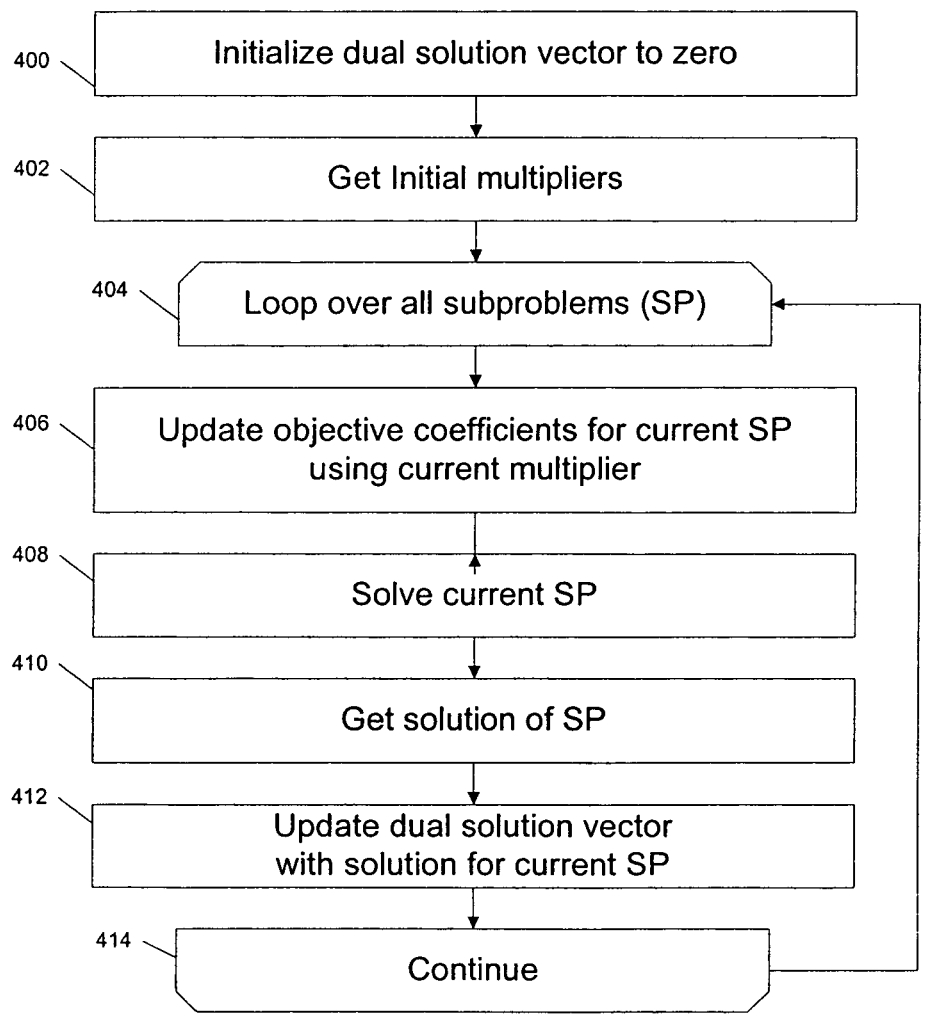
FIG. 4 illustrates the processing logic for the initial sub-problem solution step of the algorithm in an exemplary embodiment.

FIG. 4 illustrates the processing logic for the "initial sub-problem solution" step of the algorithm. In this step of the algorithm, all sub-problems are solved once for the initial set of multipliers to get the initial primal solution. If the "lower bound and initial multiplier estimation" step is skipped, an initial multiplier set of zero can be used (logic block 400), which will have little effect on the convergence of the solution process. As indicated in logic block 406, given a set of multipliers, the objective coefficients of the sub-problem are updated as follows:

$$o_k = c_k^T - \lambda^T [A_c]_k$$

where $o_k$ are the objective coefficients of the sub-problem k, and $\lambda$ is the given multiplier.

Pseudocode for the initialization sub-problem solution for initial multiplier step of the algorithm is as follows:
Initial Sub-Problem Solution for Initial Multipliers Step (Block 102)
Initialize multipliers $\lambda$;
Set Current Sub-problem Index k=0;
Set solution vector x=0;
While(k<=NumOfSubproblems)
    k=k+1;

Update sub-problem P(k) objective coefficients with current multipliers;
Solve current sub-problem;
Get solution for current sub-problem $x_k$;
Update solution x with $x_k$;
End While.

Figure 5:
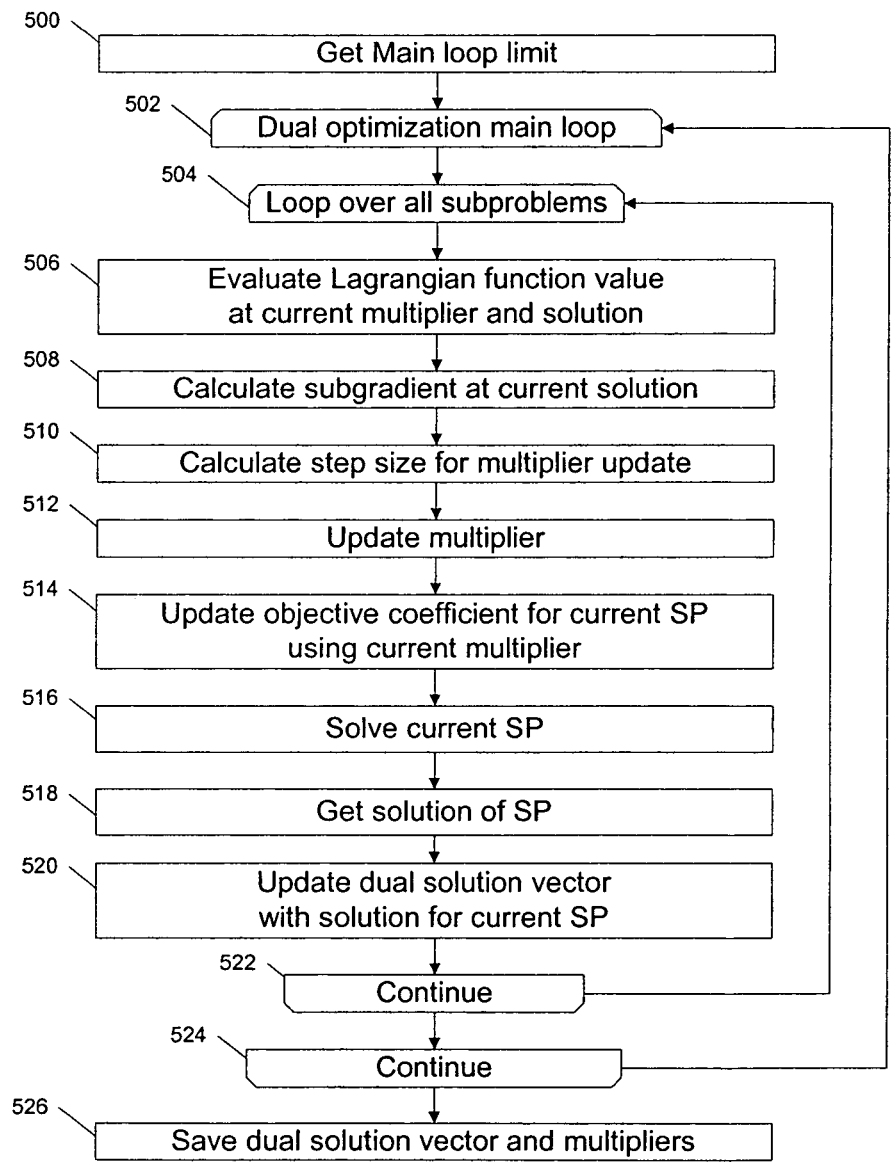
FIG. 5 illustrates the processing logic for the dual optimization step of the algorithm in an exemplary embodiment.

FIG. 5 illustrates the processing logic for the "dual optimization" step of the algorithm. The dual problem is optimized by sequentially solving sub-problems and updating the multipliers after each sub-problem solution. The Lagrangian dual function is evaluated after each sub-problem solution (logic block 506), and an update for the multipliers is calculated (logic block 512). The subgradient g at the current solution is calculated as:

$$g = b_c - A_c x.$$

The step size θ for multiplier update (logic block 510) is calculated as:

$$\theta = \frac{(LB - L_k)}{|g|^2},$$

where LB is the obtained estimate of the upper bound of the dual function, and $L_k$ is the value of the dual function evaluated using the updated dual solution after solving the $k^{th}$ sub-problem.

The multiplier is updated (logic block 512) by using equation:

$$\lambda^{new} = \lambda^{old} + \theta \cdot g,$$

where $\lambda^{old}$ and $\lambda^{new}$ represent the old and new multipliers respectively.

The objective coefficients of the current sub-problem are updated (logic block 514) in the same way as in the "initial sub-problem solution" step of the algorithm.

Pseudocode for the dual optimization by sub-problem level dual function evaluation and multiplier update step of the algorithm is as follows:
Dual Optimization by Sub-Problem Level Dual Function Evaluation and Multiplier Update Step (Block 104)
Set PassCount=0;
While(PassCount<=MaxPassCount)
    PassCount=PassCount+1;
    Set Current Sub-problem Index k=0;
    While(k<=NumOfSubproblems)
        k=k+1;
        Evaluate Lagrangian function value at current multiplier and solution;
        Calculate subgradient at current solution $g = b_c - A_c x$;
        Calculate step size for multiplier update by $$\theta = \frac{(LB - L_k)}{|g|^2};$$

Update multiplier by $\lambda^{new} = \lambda^{old} + \theta \cdot g$;
        Solve sub-problem P(k) using new multipliers;
        Get solution for current sub-problem $x_k$;
        Update solution x with $x_k$;
    End While;
End While.
Note: LB is the best estimate of the optimal value of the dual function.

Figure 6:
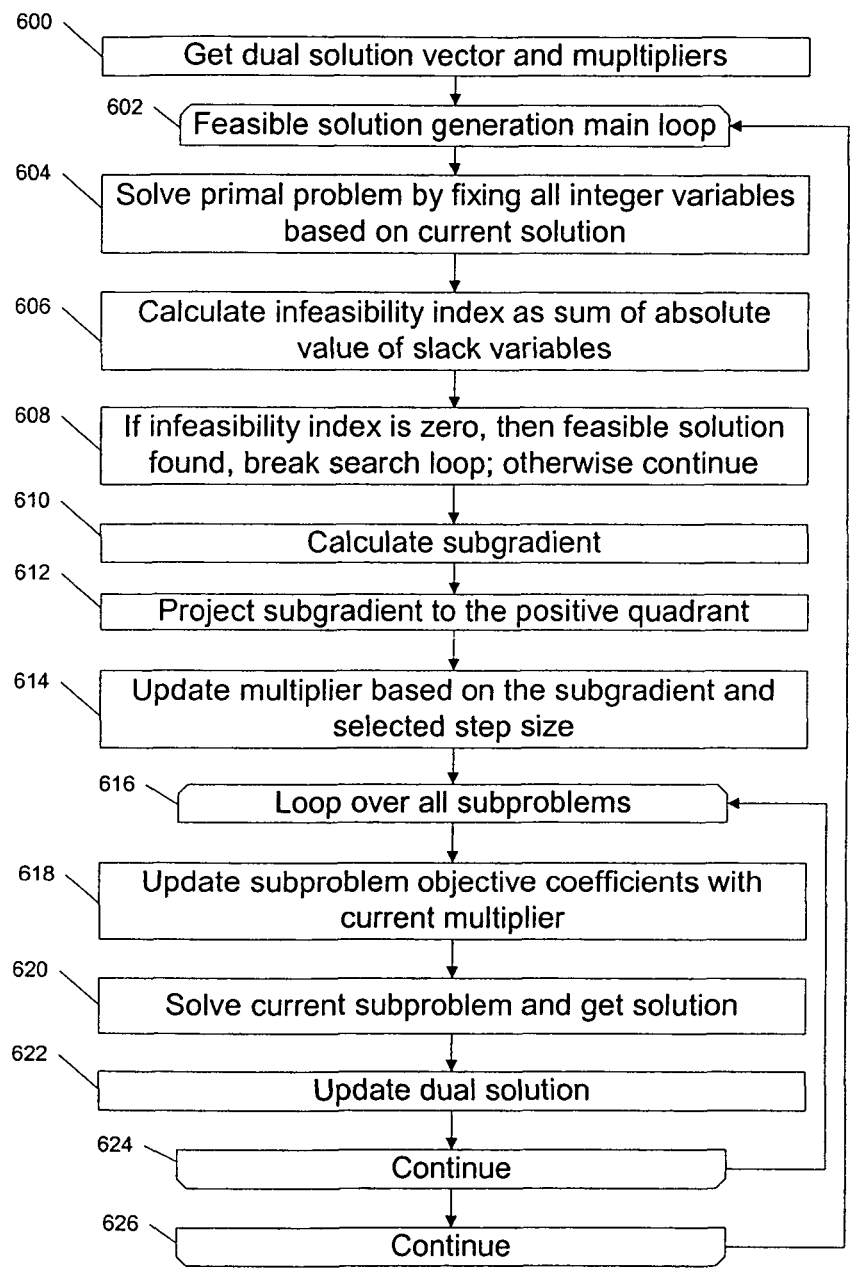
FIG. 6 illustrates the processing logic for the primal feasible solution generation step of the algorithm in an exemplary embodiment.

FIG. 6 illustrates the processing logic for the "primal feasible solution generation" step of the algorithm. This step of the algorithm searches for primal feasibility by systematically reducing coupling constraint violations. It proceeds as follows. First, the values of the integer variables of the dual solution are passed to the primal problem with slack variables (P1) and fixed, and P1 is solved to obtain a primal solution and the values of the slack variables. The infeasibility index is calculated as the sum of the absolute value of the slack variables. If the infeasibility index is zero, then a primal feasible solution is obtained and the program stops here; otherwise, it continues as follows. The subgradient is calculated as being equal to the value of the slack variable. Then the subgradient is projected to the positive quadrant as:

$$g = [g]^+.$$

The multiplier is updated as:

$$\lambda^{new} = \lambda^{old} + \beta \cdot g,$$

where β is the selected step size. The recommended value for β is from 1 to 4. Smaller β generally results in a smaller solution gap and a greater number of iterations.

Based on the new multiplier, objective coefficients of each of the sub-problems are updated similarly to step "initial sub-problem solution", and the sub-problems are solved to obtain a new dual solution. Then pass the values of the integer variables of the dual solution to problem P1. This procedure is repeated until a primal feasible solution is achieved.

Pseudocode for the primal feasible solution generation step of the algorithm is as follows:
Primal Feasible Solution Generation Step (Block 106)
Set FeasibilityDone=false;
PassCount=0;
While(Not FeasibilityDone)
    PassCount=PassCount+1;
    Solve problem PS by fixing all integer variables based on the current solution x;
    Calculate infeasibility index as sum of absolute value of slack variables;
    If(infeasibility index=0)
        FeasibilityDone=True;
        Break;
    Endif;
    Calculate subgradient $g = b_c - A_c x$;
    Project subgradient to the positive quadrant g=max(0, g);
    Update multiplier based on the subgradient and selected step size $\lambda^{new} = \lambda^{old} + \beta \cdot g$;
    Set Current Sub-problem Index k=0
    Set solution vector x=0;
    While(k<=NumOfSubproblems)
        k=k+1;
        Update sub-problem P(k) objective coefficients with current multipliers;
        Solve current sub-problem; Get solution for current sub-problem $x_k$;
        Update solution x with $x_k$;
    End While;
End While.

The method for optimization of large scale separable resource scheduling of the present invention has been described as a computer implemented process using application programs resident on a computer system that can process large scale optimization problems. It is important to note, however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as analog or digital communications links. Furthermore, those skilled in the art will appreciate that the broad concept of large scale resource scheduling optimization by sequential Lagrangian dual optimization and meta-heuristics to enforce a feasible solution are applicable to a wide range of computationally complex optimization problems and that the reference model described herein in the form of a mixed integer programming problem is used solely to describe an exemplary embodiment.

Those skilled in the art will appreciate that many modifications to the preferred embodiment of the present invention are possible without departing from the spirit and scope of the present invention. In addition, it is possible to use some of the features of the present invention without the corresponding use of other features. Accordingly, the foregoing description of the preferred embodiment is provided for the purpose of illustrating the principles of the present invention and not in limitation thereof, since the scope of the present invention is defined solely by the appended claims.

What is claimed is:

1. A computer program product for optimization of a large scale resource scheduling problem, wherein prior to run time the large scale resource scheduling problem is expressed as an original mixed integer programming (MIP) problem expression having a constraint matrix having coupling rows and a constraint matrix structure, the computer program product comprising a non-transitory computer readable medium having computer readable code embedded therein, the computer readable code comprising:
   program instructions that read the original MIP problem expression of the large scale resource scheduling problem;
   program instructions that create first and second cloned MIP problem expressions by cloning the original MIP problem expression;
   program instructions that retrieve row names for the coupling rows of the original MIP problem expression;
   program instructions that use the retrieved row names for the coupling rows to add slack variables to the coupling rows of the first cloned MIP problem expression at run time;
   program instructions that use the retrieved row names for the coupling rows to remove the coupling rows from the second cloned MIP problem expression at run time to create a relaxed problem;
   program instructions that use the constraint matrix structure to determine at run time constraint-to-sub-problem and variable-to-sub-problem mapping relations for the relaxed problem;
   program instructions that decompose the relaxed problem into a plurality of independent sub-problems at run time, using the constraint-to-sub-problem and variable-to-sub-problem mapping relations to specify to which of the plurality of independent sub-problems each constraint and variable of the relaxed problem is partitioned; and
   program instructions that determine an optimized solution to the original MIP problem expression by sequentially solving the plurality of independent sub-problems and sequentially, after solving each sub-problem, updating a set of multiplier values used in a dual optimization problem, until the dual optimization problem is converged.

2. The computer program product for optimization of a large scale resource scheduling problem of claim 1 further comprising program instructions that estimate a lower bound to the original MIP problem expression of the large scale resource scheduling problem by relaxing integrality constraints and removing sub-problem level constraints.

3. The computer program product for optimization of a large scale resource scheduling problem of claim 1 further comprising program instructions that determine an initial set of multiplier values to use in the dual optimization problem.

4. The computer program product for optimization of a large scale resource scheduling problem of claim 1 wherein the set of multiplier values updated after solving each sub-problem are a plurality of Lagrangian multipliers.

5. The computer program product for optimization of a large scale resource scheduling problem of claim 1 further comprising program instructions that use a sub matrix corresponding to the coupling rows of the constraint matrix to calculate, subgradient, wherein the set of multiplier values are updated based on the subgradient.

6. The computer program product for optimization of a large scale resource scheduling problem of claim 1 further comprising program instructions that determine an infeasibility index value for the original MIP problem expression of the large scale resource scheduling problem.

7. The computer program product for optimization of a large scale resource scheduling problem of claim 6 further comprising program instructions that determine a feasible solution to the original MIP problem expression of the large scale resource scheduling problem has been obtained when the infeasibility index value is determined to be a pre-specified value.

8. The computer program product for optimization of a large scale resource scheduling problem of claim 1 further comprising:
   program instructions that reduce residual violations of coupling constraints by computing an updated sub-gradient vector for the coupling constraints by solving a linear program version of the original MIP problem expression of the large scale resource scheduling problem by fixing all integer variables from the plurality of independent sub-problems and calculating the slack variables for the coupling rows;
   program instructions that define the sub-gradient vector by projecting the coupling rows onto a positive quadrant; and
   program instructions that use the sub-gradient vector to update each of the plurality of independent sub-problems and solve for new integer solutions and use the new integer solutions to define an updated linear program version of the original MIP problem expression to calculate a next version of the sub-gradient vector, until the residual violations in the coupling constraints are reduced to within a predefined convergence threshold.

9. The computer program product for optimization of a large scale resource scheduling problem of claim 1 wherein the set of multiplier values are updated without penalty factors.

10. The computer program product for optimization of a large scale resource scheduling problem of claim 4 further comprising program instructions that, after solving each sub-problem, use a sub matrix corresponding to the coupling rows of the constraint matrix to calculate a subgradient and project the subgradient into a positive quadrant, wherein the plurality of Lagrangian multipliers are updated as a function of the subgradient.

11. The computer program product for optimization of a large scale resource scheduling problem of claim 5 wherein the subgradient is calculated after solving each sub-problem and, after calculating the subgradient after solving each sub-problem, the set of multiplier values are updated based on the subgradient.

12. A non-transitory computer readable storage medium having embodied thereon a plurality of machine-readable instructions configured to be executed by a computer processor to optimize a large scale resource scheduling problem, wherein, prior to run time, the large scale resource scheduling problem has been formulated as a mixed integer programming (MIP) problem formulation having coupling rows and a constraint matrix structure, the plurality of machine-readable instructions comprising:
  instructions to read the MIP problem formulation of the large scale resource scheduling problem;
  instructions to retrieve row names for the coupling rows of the MIP problem formulation;
  instructions to estimate initial values for a plurality of Lagrangian multipliers at run time based on the constraint matrix structure;
  instructions to use the retrieved row names for the coupling rows to create a relaxed problem by removing coupling rows from the MIP problem formulation at run time;
  instructions to use the constraint matrix structure to identify a mapping of variables and constraints to a plurality of uncoupled sub-problems;
  instructions to decompose the relaxed problem into the plurality of uncoupled sub-problems at run time based on the mapping of variables and constraints to the plurality of uncoupled sub-problems;
  instructions to determine an optimal solution to a Lagrangian dual optimization problem by sequentially solving the plurality of uncoupled sub-problems and sequentially, after solving each sub-problem, updating at run time the plurality of Lagrangian multipliers used in the Lagrangian dual optimization problem; and
  instructions to iteratively reduce a plurality of coupling constraint violations and iteratively update the plurality of Lagrangian multipliers to search for a feasible solution to the MIP problem formulation of the large scale resource scheduling problem.

13. The computer readable storage medium of claim 12 wherein the instructions to estimate initial values for the plurality of Lagrangian multipliers at run time based on the constraint matrix structure comprise:
  instructions to create a relaxed version of the MIP problem formulation by integer relaxation and removing sub-problem level constraints from the MIP problem formulation at run time based on the constraint matrix structure; and
  instructions to solve the relaxed version of the MIP problem.

14. The computer readable storage medium of claim 13 wherein the relaxed version of the MIP problem formulation has all coupling constraints removed.

15. The computer readable storage medium of claim 12 wherein the plurality of machine-readable instructions comprise:
  Instructions to use a sub matrix corresponding to the coupling rows to determine a subgradient after solving each sub-problem;
  instructions to project the subgradient into a positive quadrant; and
  instruction to update the plurality of Lagrangian multipliers, after solving each sub-problem, as a function of the subgradient.

16. The computer readable storage medium of claim 12 wherein the plurality of machine-readable instructions comprise instructions to use the retrieved row names for the coupling rows to add slack variables at run time to the coupling rows of the MIP problem.

17. The computer readable storage medium of claim 12 wherein the optimal solution to the Lagrangian dual optimization problem and the feasible solution to the MIP problem formulation of the large scale resource scheduling problem are based on the constraint matrix structure and are obtained independent from knowledge at run time of problem domain information of the large scale resource scheduling problem.

18. The computer readable storage medium of claim 12 wherein execution of the plurality of machine-readable instructions by the computer processor obtains the optimal solution to the Lagrangian dual optimization problem in a small number of iterations.

19. The computer readable storage medium of claim 12 wherein the plurality of machine-readable instructions comprise:
  instructions to estimate a lower bound to the MIP problem formulation of the large scale resource scheduling problem by relaxing sub-problem-level constraints and integer relaxation; and
  instructions to use the lower bound to the MIP problem formulation of the large scale resource scheduling problem as an estimate of the upper bound of the Lagrangian dual optimization problem.

20. The computer readable storage medium of claim 12 wherein the plurality of Lagrangian multipliers are updated without using penalty factors.

21. The computer readable storage medium of claim 12 wherein the plurality of machine-readable instructions are configured to obtain a feasible solution to the MIP problem formulation of the large scale resource scheduling problem and optimize the large scale resource scheduling problem independent from knowledge at run time of problem domain information of the large scale resource scheduling problem.

22. A non-transitory computer readable storage medium having embodied thereon a plurality of machine-readable instructions configured to be executed by a computer processor to optimize a large scale resource scheduling problem, wherein, prior to run time, the large scale resource scheduling problem has been expressed as a mixed integer programming (MIP) problem expression having coupling rows and a constraint matrix structure, the plurality of machine-readable instructions comprising:
  instructions to read the MIP problem expression of the large scale resource scheduling problem;
  instructions to retrieve row names for the coupling rows of the MIP problem expression;
  instructions to create a relaxed version of the MIP problem expression at run time by relaxing integer variables and removing local constraints from the MIP problem expression;
  instructions to solve the relaxed version of the MIP problem expression to determine initial values for a plurality of Lagrangian multipliers;
  instructions to create a relaxed problem by using the retrieved row names for the coupling rows to remove coupling constraints at run time from the MIP problem expression;
  instructions to use the constraint matrix structure to determine constraint-to-sub-problem and variable-to-sub-problem mapping relations;
  instructions to decompose the relaxed problem into a plurality of independent sub-problems at run time using the constraint-to-sub-problem and variable-to-sub-problem mapping relations to specify into which of the plurality of independent sub-problems each constraint and variable of the relaxed problem is partitioned;
instructions to sequentially solve the plurality of independent sub-problems and sequentially, after solving each sub-problem:
determine a subgradient of a dual optimization problem, project the subgradient into a positive quadrant, and update the plurality of Lagrangian multipliers as a function of the subgradient; and
instructions to correct residual infeasibility in the coupling constraints and iteratively update the plurality of Lagrangian multipliers to search for a feasible solution to the MIP problem expression of the large scale resource scheduling problem.

23. The computer readable storage medium of claim 22 wherein the plurality of machine-readable instructions are configured to obtain the feasible solution to the MIP problem expression of the large scale resource scheduling problem and optimize the large scale resource scheduling problem based on the constraint matrix structure and independent from run time knowledge of problem domain information for the large scale resource scheduling problem.

24. The computer program product for optimization of large scale resource scheduling of claim 1 wherein the constraint matrix structure comprises positions of zero and non-zero elements in the constraint matrix, and the program instructions that use the constraint matrix structure to determine the constraint-to-sub-problem and variable-to-sub-problem mapping relations for the relaxed problem comprise program instructions that use the positions of the zero and non-zero elements in the constraint matrix to determine the constraint-to-sub-problem and variable-to-sub-problem mapping relations.

25. The computer program product for optimization of a large scale resource scheduling problem of claim 1 wherein the program instructions that retrieve row names for the coupling rows of the original MIP problem expression include program instructions that retrieve the row names for the coupling rows of the original MIP problem expression from an external file.

26. The computer program product for optimization of a large scale resource scheduling problem of claim 1 wherein the program instructions that determine an optimized solution to the original MIP problem expression by sequentially solving the plurality of independent sub-problems include program instructions that sequentially send the plurality of independent sub-problems to a standard MIP solver for solution and that sequentially receive solutions to the plurality of independent sub-problems from the standard MIP solver.

27. The computer readable storage medium of claim 12 wherein the instructions to determine an optimal solution to the Lagrangian dual optimization problem by sequentially solving the plurality of uncoupled sub-problems include instructions to use a standard MIP solver to sequentially solve the plurality of uncoupled sub-problems.

28. The computer readable storage medium of claim 13 wherein:
the plurality of machine-readable instructions comprise instructions to retrieve a list of string identifiers from an external file; and
the string identifiers identify the sub-problem level constraints for removal to create the relaxed version of the MIP problem formulation.

29. The computer readable storage medium of claim 22 wherein:
the plurality of machine-readable instructions comprise instructions to retrieve a list of string identifiers from an external file;
the string identifiers identify the local constraints for removal to create the relaxed version of the MIP problem expression; and
the instructions to sequentially solve the plurality of independent sub-problems include instructions to use an external standard MIP solver to sequentially solve the plurality of independent sub-problems.

30. The computer readable storage medium of claim 12 wherein the constraint matrix structure comprises positions of zero and non-zero elements in a constraint matrix, and the instructions to use the constraint matrix structure to identify the mapping of variables and constraints to the plurality of uncoupled sub-problems comprise instructions to use the positions of zero and non-zero elements in the constraint matrix to identify the mapping of variables and constraints to the plurality of uncoupled sub-problems.

31. The computer readable storage medium of claim 22 wherein the constraint matrix structure comprises positions of zero and non-zero elements in a constraint matrix, and the instructions to use the constraint matrix structure to determine constraint-to-sub-problem and variable-to-sub-problem mapping relations comprise instructions to use the positions of zero and non-zero elements in the constraint matrix to determine the mapping relations.

* * * * *